(12) United States Patent
Kim et al.

(10) Patent No.: US 10,859,279 B2
(45) Date of Patent: Dec. 8, 2020

(54) WINDOW-TYPE SMART AIR PURIFYING VENTILATOR

(71) Applicant: Gongzone S&T Co., Ltd., Seoul (KR)

(72) Inventors: Woo Hyun Kim, Seoul (KR); Yeon Mee Kim, Seoul (KR); Keum Young Seo, Seoul (KR); Ja Hyeon Chang, Seoul (KR)

(73) Assignee: Gongzone S&T Co., Ltd., Seoul (KR)

( * ) Notice: Subject to any disclaimer, the term of this patent is extended or adjusted under 35 U.S.C. 154(b) by 159 days.

(21) Appl. No.: 16/108,877

(22) Filed: Aug. 22, 2018

(65) Prior Publication Data

US 2019/0383505 A1 Dec. 19, 2019

(30) Foreign Application Priority Data

Jun. 15, 2018 (KR) .................. 10-2018-0069174

(51) Int. Cl.
| | | |
|---|---|---|
| *E06B 7/02* | (2006.01) | |
| *F24F 7/013* | (2006.01) | |
| *F24F 11/00* | (2018.01) | |
| *F24F 13/28* | (2006.01) | |
| *F24F 13/15* | (2006.01) | |
| *F24F 13/24* | (2006.01) | |
| *F24F 11/523* | (2018.01) | |
| *F24F 11/56* | (2018.01) | |
| *F24F 11/88* | (2018.01) | |

(Continued)

(52) U.S. Cl.
CPC .......... *F24F 7/013* (2013.01); *F24F 11/0001* (2013.01); *F24F 11/523* (2018.01); *F24F 11/56* (2018.01); *F24F 11/88* (2018.01); *F24F 13/15* (2013.01); *F24F 13/24* (2013.01); *F24F 13/28* (2013.01); *F24F 2011/0002* (2013.01); *F24F 2013/247* (2013.01); *F24F 2110/12* (2018.01); *F24F 2110/22* (2018.01); *F24F 2110/52* (2018.01); *F24F 2110/65* (2018.01)

(58) Field of Classification Search
CPC .......... F24F 7/013; F24F 1/027; F24F 3/1603; F24F 13/15; F24F 13/18
USPC ........................................ 454/201, 205–210
See application file for complete search history.

(56) References Cited

U.S. PATENT DOCUMENTS

| | | | |
|---|---|---|---|
| 10,001,288 B1* | 6/2018 | Yang | ........................ F24F 13/10 |
| 2012/0222724 A1* | 9/2012 | Nakata | .............. H01L 31/03528 |
| | | | 136/250 |
| 2014/0094973 A1* | 4/2014 | Giaimo, III | .............. G01H 3/10 |
| | | | 700/280 |

FOREIGN PATENT DOCUMENTS

| | | |
|---|---|---|
| KR | 10-0656141 B1 | 12/2006 |
| KR | 10-2012-0028045 A | 3/2012 |

(Continued)

*Primary Examiner* — Vivek K Shirsat
(74) *Attorney, Agent, or Firm* — Sughrue Mion, PLLC

(57) ABSTRACT

The present invention relates to a smart air purifying ventilator installed on a window frame. More specifically, the smart air purifying ventilator of the present invention includes a frame part installed on a window frame and having two or more openings formed therein, a blowing part installed in the frame part and responsible for introducing or discharging air through the openings, filters for purifying air introduced or discharged by the blowing part, an outdoor side cover part coupled to one side of the frame part, a front panel part coupled to another side of the frame part, and a control unit for comparing the inside and outside air conditions of the window frame and controlling the blowing part to determine inflow or outflow of air.

16 Claims, 9 Drawing Sheets

(51) Int. Cl.
    *F24F 110/12*     (2018.01)
    *F24F 110/22*     (2018.01)
    *F24F 110/52*     (2018.01)
    *F24F 110/65*     (2018.01)

(56) References Cited

FOREIGN PATENT DOCUMENTS

| | | |
|---|---|---|
| KR | 20-2013-0001577 U | 3/2013 |
| KR | 20-2016-0002925 U | 8/2016 |
| KR | 10-2017-0139388 A | 12/2017 |
| KR | 10-2017-0140704 A | 12/2017 |
| KR | 10-2018-0045963 A | 5/2018 |

\* cited by examiner

WINDOW-TYPE SMART AIR PURIFYING VENTILATOR

CROSS-REFERENCE TO RELATED APPLICATION

This application claims priority to Korean Patent Application No. 10-2018-0069174, filed on Jun. 15, 2018 in the Korean Intellectual Property Office, the disclosure of which is incorporated herein by reference.

TECHNICAL FIELD

The present invention relates to a window-type smart air purifying ventilator installed in a window, and more particularly, to a window-type smart air purifying ventilator having a ventilation function of introducing fresh air from the outside to the inside and discharging polluted air from the inside to the outside.

BACKGROUND ART

People spend most of their lives in indoor spaces inside a building, and people spend much time indoors for work, rest, or residence. When an indoor space is kept in a closed state without ventilation, the concentration of carbon dioxide increases due to exhaustion of oxygen in the air and the amount of dust increases, such that air quality may be deteriorated. As a general method of ventilating the indoor space, a window is opened so that outside air sufficiently enters the indoor space and inside air flows out.

However, when outside air contains pollutants such as various types of fine dust and yellow dust, the above-mentioned general ventilation method cannot allow fresh air to flow into the indoor space. Therefore, in this case, an air purifier should be separately installed and operated with windows closed. However, even when the outside air is contaminated, it is necessary to ventilate the indoor space with the outside air. Otherwise, the quality of the indoor air also becomes very poor. To solve this problem, an air purifying method in which a filter for filtering fine dust or the like is temporarily installed on a window frame to reduce the amount of fine dust when outside air enters the room is also used.

To overcome these problems, a number of inventions have been disclosed for a device installed in a window and capable of informing a user of atmospheric conditions and performing ventilation. For example, Republic of Korea Utility Model Publication No. 20-2016-0002925 (publication date: Aug. 23, 2016) discloses a technology of receiving atmospheric environment data including information on fine dust from an atmospheric environment data server and, based on the atmospheric environment data, informing a user the atmospheric conditions through an information providing device to help the user decide whether or not to open windows.

RELATED ART DOCUMENTS

Patent Document (Patent Document 1) Republic of Korea Utility Model Publication No. 20-2016-0002925 (publication date: Aug. 23, 2016)

DISCLOSURE

Technical Problem

Therefore, the present invention has been made in view of the above problems, and it is one object of the present invention to provide a window-type air purifying ventilator installed in a window and capable of keeping indoor air in a pleasant state through a ventilation function of introducing fresh air from the outside to the inside and discharging polluted air from the inside to the outside.

It is another object of the present invention to provide a window-type air purifying ventilator capable of automatically performing ventilation by comparing indoor/outdoor air quality data.

Technical Solution

In accordance with one aspect of the present invention, provided is a window-type smart air purifying ventilator including a frame part installed on a window frame and having two or more openings formed therein, a blowing part installed in the frame part and responsible for introducing or discharging air through the openings, filters for purifying air introduced or discharged by the blowing part, an outdoor side cover part coupled to one side of the frame part, a front panel part coupled to another side of the frame part, and a control unit for comparing the inside and outside air conditions of the window frame and controlling the blowing part to determine inflow or outflow of air.

Preferably, the frame part is installed on the window frame to be opened and closed in a sliding manner.

Preferably, the outdoor side cover part includes a plurality of wings capable of rotating, and depending on operation of the wings, opening or closing is performed.

Preferably, during rain, the wings are driven to completely or partially shield the outdoor side cover part.

Preferably, solar cell units are installed on the outdoor side cover part or the wings, convert sunlight into electric energy, and supply electric power to the blowing part.

Preferably, the filter is a multilayer filter in which a filter for filtering large particles, a PM10 filter for filtering fine dust, and a PM2.5 filter for filtering ultrafine dust are arranged in order.

Preferably, the control unit includes a sensor for detecting at least one of indoor/outdoor temperatures, humidity, noise levels, fine dust concentration, $CO_2$ concentration, and pollutant concentration, and depending on information detected by the sensors, at least one of the inflow/outflow of air through the blowing part and the rotation speed of the fans is controlled.

Preferably, the sensors measure an indoor noise level. When an indoor noise level is greater than or equal to a predetermined value, the rotation speed of the fans is increased to accelerate the inflow/outflow of air. When an indoor noise level is less than or equal to a predetermined value, the rotation speed of the fans is decreased or operation of the fans is stopped.

Preferably, the front panel part further includes a display for displaying at least one of indoor/outdoor fine dust amounts, temperature, humidity, weather information, and an image of scenery outside the window frame.

Preferably, the control unit is connected to a server and controlled by a communication means.

Preferably, one opening is formed in the frame part, wherein the opening is disposed at the upper or lower end of the window frame.

Preferably, the frame part is installed on the window frame of a vehicle, and circulates the air of the vehicle.

In accordance with another aspect of the present invention, provided is a window-type smart air purifying ventilator including a frame part slidably installed on a window frame, a blowing part installed inside the frame part and responsible for introducing air into one side of the frame part or for discharging air to another side of the frame part, a filter for removing foreign substances from air introduced or discharged by the blowing part, and a control unit for controlling at least one of the inflow/outflow of air through the blowing part and the rotation speed of the blowing part, depending on at least one of temperature difference between one side and another side of the window frame, humidity, fine dust concentration, $CO_2$ concentration, and pollutant concentration.

Preferably, the window-type smart air purifying ventilator further includes an outdoor side cover part coupled to one side of the frame part, and a front panel part coupled to another side of the frame part, wherein the outdoor side cover part includes a plurality of wings capable of being rotated, and depending on the rotation of the wings, opening or closing is performed, and the front panel part includes a display for displaying at least one of indoor/outdoor fine dust concentrations, temperature, humidity, weather information, and an image of an outside of the window frame.

Preferably, the control unit includes a sensor for detecting at least one of indoor/outdoor temperatures, humidity, noise levels, fine dust concentration, $CO_2$ concentration, and pollutant concentration, wherein the sensor measures a surrounding noise level and controls the fans so that, when a surrounding noise level is greater than or equal to a predetermined value, the rotation speed of the fans is increased, and when a surrounding noise level is less than or equal to a predetermined value, the rotation speed of the fans is decreased or operation of the fans is stopped.

Preferably, solar cell units are installed on the outdoor side cover part, convert sunlight into electric energy, and supply electric power to the blowing part.

Preferably, the filter is a multilayer filter in which a filter for filtering large particles, a PM10 filter for filtering fine dust, and a PM2.5 filter for filtering ultrafine dust are arranged in order.

Preferably, the control unit is connected to a server and controlled by a communication means.

Preferably, the frame part is installed on the window frame of a vehicle, and circulates the air of the vehicle.

Advantageous Effects

The window-type smart air purifying ventilator according to the present invention can introduce outside air into the indoor space or discharge indoor air to the outside depending on the temperatures of indoor and outdoor air and the pollution degree of indoor and outdoor air, thereby improving the quality of indoor air.

The window-type smart air purifying ventilator can supply purified air through filters into the indoor space even when outside air is polluted.

The window-type smart air purifying ventilator includes wings that are opened and closed toward the outside. Therefore, during rain, inflow of rainwater into the indoor space can be blocked. In addition, the window-type smart air purifying ventilator also has a heat shielding effect and a heat insulating effect.

According to the window-type smart air purifying ventilator, since the speed of the fans can be controlled depending on noise levels, the fans can be efficiently driven.

BEST MODE

The specific structures and functional description in the embodiments of the present invention are presented only for the purpose of illustrating the concept of the present invention, and the present invention can be implemented in various forms. In addition, it is to be understood that the present invention is not limited to the embodiments of the present invention, but includes all modifications, equivalents, and alternatives falling within the spirit and scope of the present invention.

Hereinafter, the present invention will be described in detail with reference to the accompanying drawings.

Figure 1:
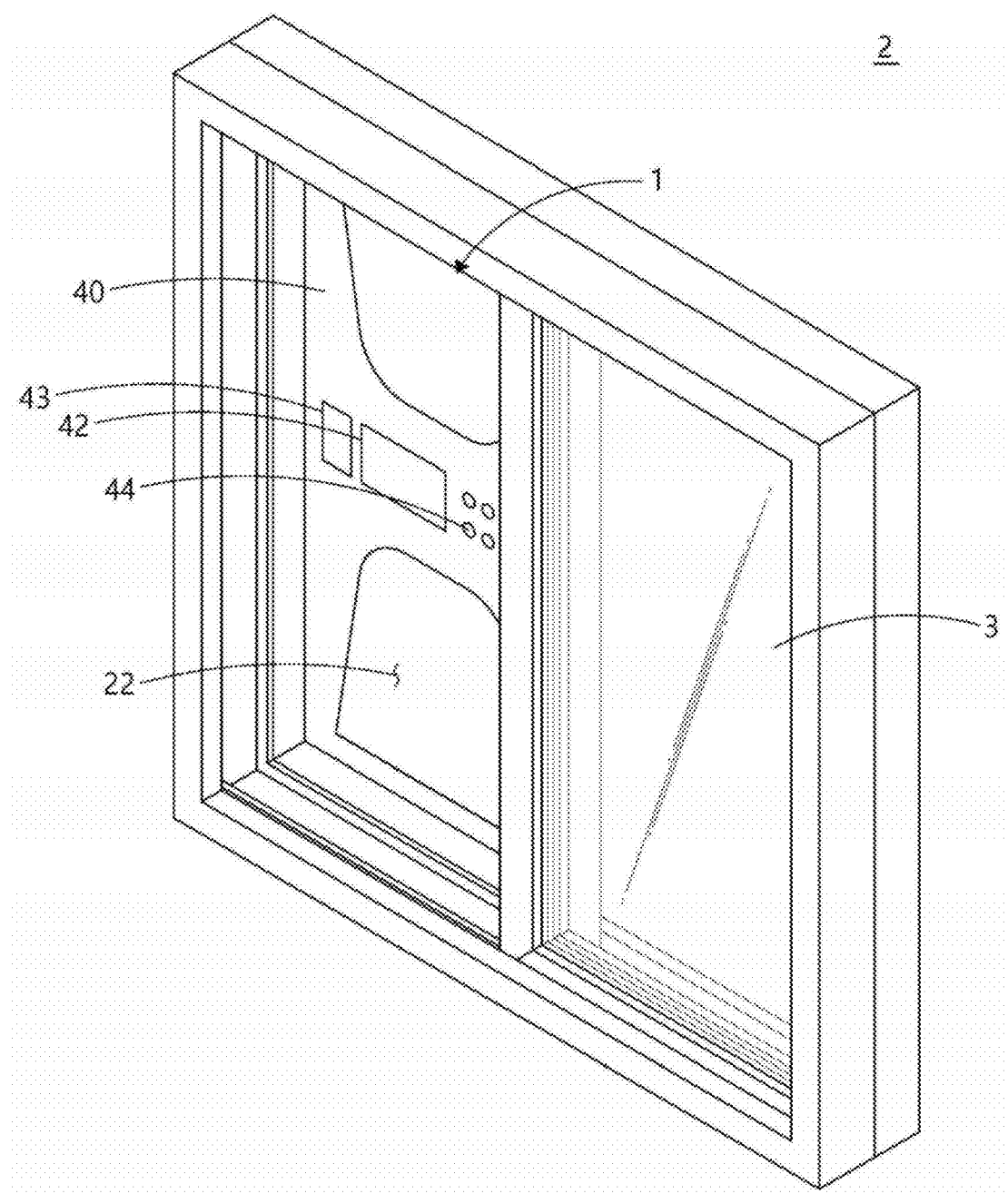
FIG. 1 is a front perspective view of a window-type smart air purifying ventilator according to an embodiment of the present invention.
Figure 2:
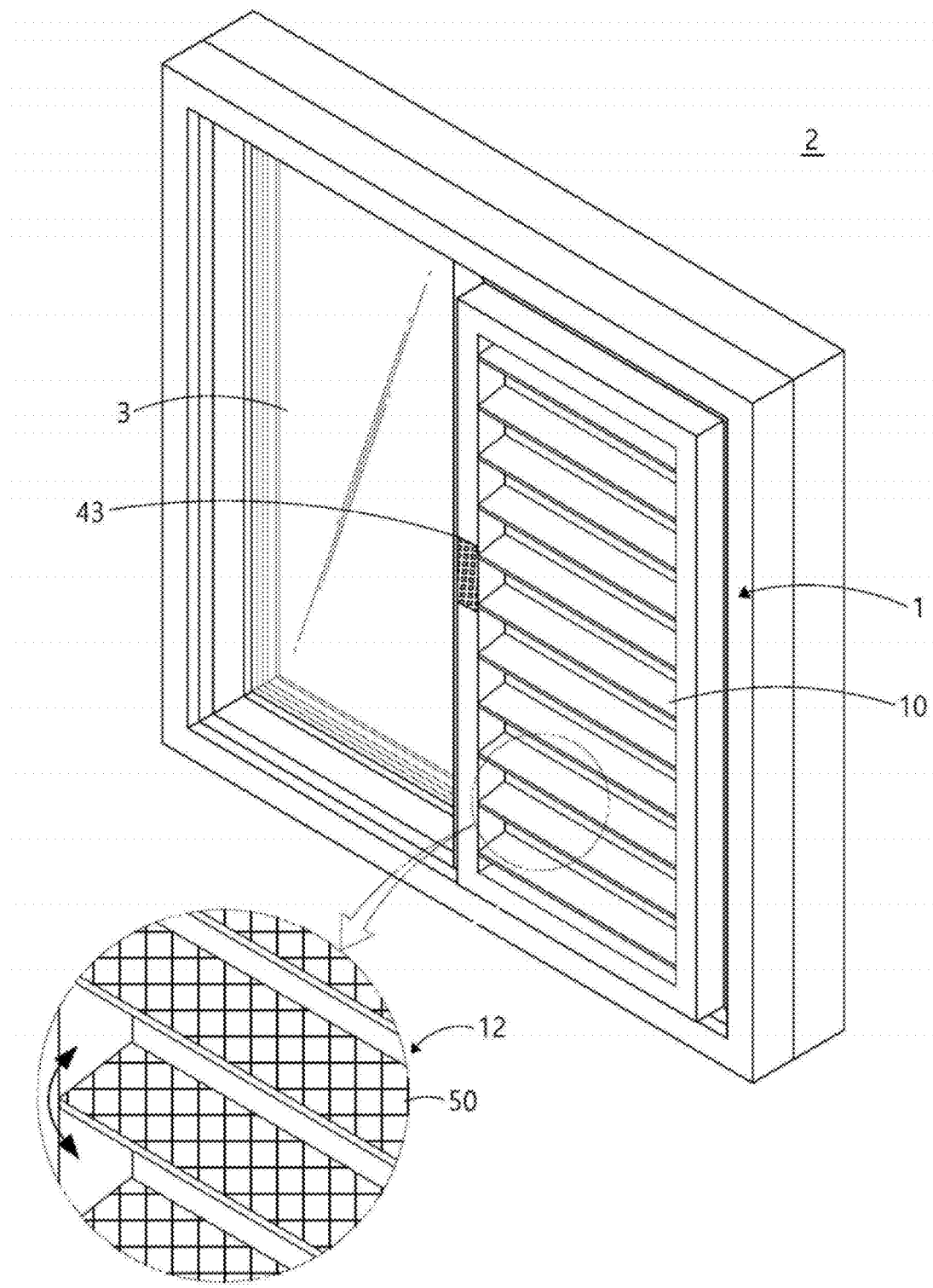
FIG. 2 is a rear perspective view of a window-type smart air purifying ventilator according to an embodiment of the present invention.
Figure 3:
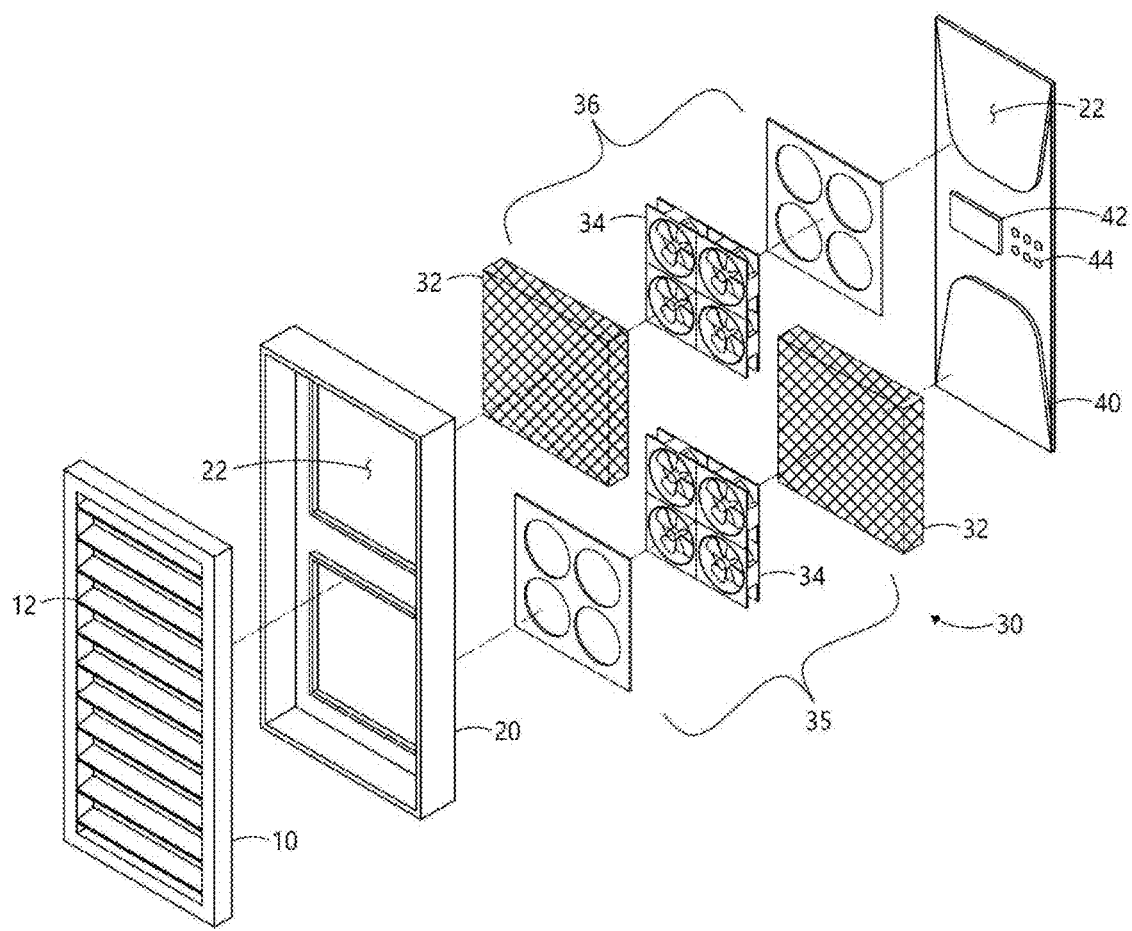
FIG. 3 is an exploded perspective view of a window-type smart air purifying ventilator according to an embodiment of the present invention.

FIGS. 1 and 2 are front and rear perspective views, respectively, of a window-type smart air purifying ventilator according to an embodiment of the present invention, and FIG. 3 is an exploded perspective view of a window-type smart air purifying ventilator according to an embodiment of the present invention.

A window-type smart air purifying ventilator 1 (hereinafter referred to as 'smart air purifying ventilator') is installed on a window frame 2. Specifically, the smart air purifying ventilator 1 may be installed to be slidable in the right/left directions on the window frame 2, similar to a window installed on the window frame 2.

The smart air purifying ventilator 1 may include a frame part 20 slidably installed on the window frame 2 and having two or more openings 22 formed therein, a blowing part 30 provided in the frame part 20 and responsible for introducing or discharging air through the openings 22, filters 32 for purifying air introduced or discharged by the blowing part 30, a front panel part 40 coupled to the frame part 20 to face the indoor side, and an outdoor side cover part 10 coupled to the frame part 20 to face the outdoor side.

In addition, the smart air purifying ventilator 1 of the present invention may measure the degree of pollution of indoor and outdoor air, temperature, humidity, and the like, and may further include a control unit (not shown) for controlling the blowing part 30 to determine inflow or outflow of air through the openings 22.

The control unit may include sensors 43 capable of measuring fine dust concentration, the degree of air pollution caused by pollutants such as formaldehyde and volatile organic compounds (VOCs), temperature, humidity, and the like, a communication unit (not shown) capable of communicating with an external smartphone or the like, and a power supply unit capable of turning on/off the smart air purifying ventilator 1.

The frame part 20 is installed on the existing window frame 2, specifically, at the portion where a window 3 is coupled. The frame part 20 may reciprocate in a sliding manner along this portion.

A porous member (not shown) such as a sponge is further provided on the outer circumferential surface of the frame part 20. Therefore, when the smart air purifying ventilator 1 is installed on the window frame 2, the gap between the window frame 2 and the smart air purifying ventilator 1 is sealed by the porous member, thereby improving airtightness.

The openings 22 are formed on one surface of the frame part 20. Indoor air may be discharged to the outside through the openings 22, or the openings 22 may serve as an air inflow passage through which outside air flows into the indoor space. Alternatively, a plurality of the openings 22 may be formed. Any one of the openings 22 may discharge indoor air to the outside, and the other of the openings 22 may serve as a passage through which outside air flows into the indoor space.

However, the openings 22 need not have different air movement directions. According to user convenience, through the openings 22, only inflow of air may be performed or only outflow of air may be performed.

The blowing part 30 is composed of one or more fans 34 and serves to forcibly discharge indoor air to the outside.

The blowing part 30 is disposed in the openings 22 and is composed of one or more of the fans 34.

As the filters 32, a single filter or multilayer filter may be used. When a multilayer filter in which a filter for filtering large particles, a PM10 filter for filtering fine dust, and a PM2.5 filter for filtering ultrafine dust are arranged in order is used as the filters 32, air purification may be effectively performed.

Preferably, low-noise fans are used as the fans 34 provided in the blowing part 30.

In the filters 32 and the blowing part 30 installed in the openings 22, first second blowers 35 and 36, in which the filter 32 and the blowing part 30 are differently arranged according to air movement directions, are respectively located in the upper and lower openings 22.

The first blower 35 including the filter 32 and the blowing part 30 arranged in the order of the openings 22—the blowing part 30—the filter 32 serves to introduce outside air into the indoor space. The second blower 36 including the filter 32 and the blowing part 30 arranged in the order of the openings 22—the filter 32—the blowing part 30 serves to discharge indoor air to the outside. In addition, since the second blower 36 serves to discharge indoor air to the outside, the second blower 36 may not be provided with the filter 32.

Considering the number of the fan 34 constituting the blowing part 30, one fan 34 having a large ventilation capacity may be used. When the fan 34 having a small capacity or a small size is used, a plurality of fans 34 may be installed in parallel.

In the smart air purifying ventilator 1, the openings 22 may be set so that the air movement directions thereof are different from each other. Therefore, the smart air purifying ventilator 1 may ventilate the indoor space effectively and quickly.

In addition, since arrangement of the filters 32 and the blowing part 30 may be changed, the upper and lower openings 22 may all have a structure capable of introducing air or a structure capable of discharging air. That is, the position of the filters 32 may be adjusted depending on whether the blowing part 30 introduces air or discharges air. In particular, in the case of the blowing part 30 for discharging indoor air to the outside, the filter 32 may be omitted.

The front panel part 40 is disposed on the indoor side with respect to the window frame 2 and includes a display 42 for providing information, various buttons 44, and a control unit.

The concentration of fine indoor dust, temperature, humidity and external weather conditions are displayed on the display 42. In addition, the current state of the blowing part 30 is displayed on the display 42.

The buttons 44 provided on the front panel part 40 may be manually operated to discharge indoor air to the outside or introduce outdoor air into the indoor space. In addition, by operating the buttons 44, the blowing part 30 and wings 12 of the outdoor side cover part 10 may be set to a manual or automatic mode.

The outdoor side cover part 10 is disposed on the outdoor side with respect to the window frame 2. The wings 12 are rotatably installed in the outdoor side cover part 10 in the vertical direction so that the outdoor side cover part 10 may be opened/closed by controlling rotation of the wings 12. Therefore, when rain or snow falls, some or all of the wings 12 may be closed to prevent rain or snow from entering the indoor space. In addition, inflow of wind may be prevented by closing the wings 12. In this case, closing the wings 12 may have the same effect as closing the window 3.

Since the outdoor side cover part 10 is disposed on the outdoor side, the outdoor side cover part 10 is easily exposed to the sun. Therefore, the outdoor side cover part 10 may further include solar cell units 50 that convert sunlight into electric energy and supply the electric energy to the fans 34.

For example, the solar cell units 50 may be attached to the upper portion of each of the wings 12, and electric energy is generated while the solar cell units 50 are exposed to sunlight. The generated electric energy is supplied to the fans 34 provided in the blowing part 30 to enable ventilation of the indoor space. In this case, a solar tracker (not shown) may be further provided on the wings 12 having the solar cell units 50 attached thereto. Therefore, the amount of sunlight received by the solar cell units 50 may be increased by adjusting the rotation angle of the wings 12 in accordance with change of sun altitudes, and as a result, the amount of generated electric energy may be increased. That is, the solar tracker may adjust the rotation angle of the wings 12 so that sunlight and the wings 12 form an optimal angle. As a result, a certain amount of sunlight steadily reaches the solar cell units 50 in accordance with change of sun altitudes.

In addition, the solar cell units 50 do not necessarily have to be installed on the wings 12. The solar cell units 50 may be installed on one side of the outdoor side cover part 10 to convert sunlight into electric energy.

The amount of electric energy consumed may be reduced when the fans 34 of the blowing part 30 are driven using electric power generated through the solar cell units 50 installed in such a manner, compared with the case where the blowing part 30 is driven using a separately installed power supply.

The control unit provided in the front panel part 40 further includes various sensors 43. In the automatic mode, the sensors 43 measure temperature, humidity, and air pollution in the indoor space and the outside, compare measured values, and provide information to automatically control the air movement direction. The sensors 43 installed in the control unit may include an acoustic sensor, a temperature sensor, and a pollution detection sensor. Functions of each sensor will be described below.

The acoustic sensor measures an indoor noise level. When indoor and outdoor noise levels are greater than or equal to a predetermined value, the acoustic sensor performs control so that the fans 34 of the blowing part 30 rotate at a high speed, thereby enabling rapid indoor ventilation. When the outdoor noise level is higher than the indoor noise level, the acoustic sensor performs control so that the fans 34 of the blowing part 30 slowly rotate, so that a user does not feel uncomfortable due to the noise of the fans 34. That is, the acoustic sensor measures noise generated from the inside and outside of the window frame 2. When noise levels at both sides are high, the acoustic sensor controls the rotation speed of the fans 34 to be increased, and when the inside noise level is less than the outside noise level, the acoustic sensor controls the rotation speed of the fans 34 to be decreased.

In the case of the temperature sensor, when the indoor temperature is higher than the outside temperature in the summer, the temperature sensor performs control so that the blowing part 30 operates to discharge the hot indoor air to the outside and introduce the cool outside air into the indoor space. In addition, when the indoor temperature is sufficiently low, the temperature sensor controls the blowing part 30 to stop so that indoor air is not discharged to the outside.

The pollution detection sensor measures indoor and outdoor air pollution levels. When the indoor air is polluted and ventilation is required, the pollution detection sensor performs control so that ventilation is performed to introduce the outside air into the indoor space. When the outside air condition is worse than the indoor air condition due to fine dust or yellow dust, the pollution detection sensor performs control so that the blowing part 30 operates to discharge the indoor air to the outside. That is, the sensors 43 provided in the control unit control the direction of air flow between the indoor space and the outside to keep the indoor space comfortable.

In addition, the front panel part 40 may further include at least one camera. The outer sides of the window frame 2 may be photographed by the camera, and the photographed image may be displayed on the display 42. That is, since the visual field of the window 3 is blocked by the smart air purifying ventilator 1 installed on the window frame 2, users may feel uncomfortable. To solve this inconvenience, an external image photographed by the camera may be displayed in the indoor space.

Compared with the existing ventilation method of simply opening the window 3, when the indoor space is ventilated using the smart air purifying ventilator 1, air purified by the filters 32 may be introduced into and discharged from the indoor space, so that a more pleasant indoor environment may be created. In addition, the outdoor air may be forcibly introduced or the indoor air may be forcibly discharged by the fans 34 of the blowing part 30 even when the wind is not blowing, so that a pleasant indoor environment may be effectively created.

Figure 4:
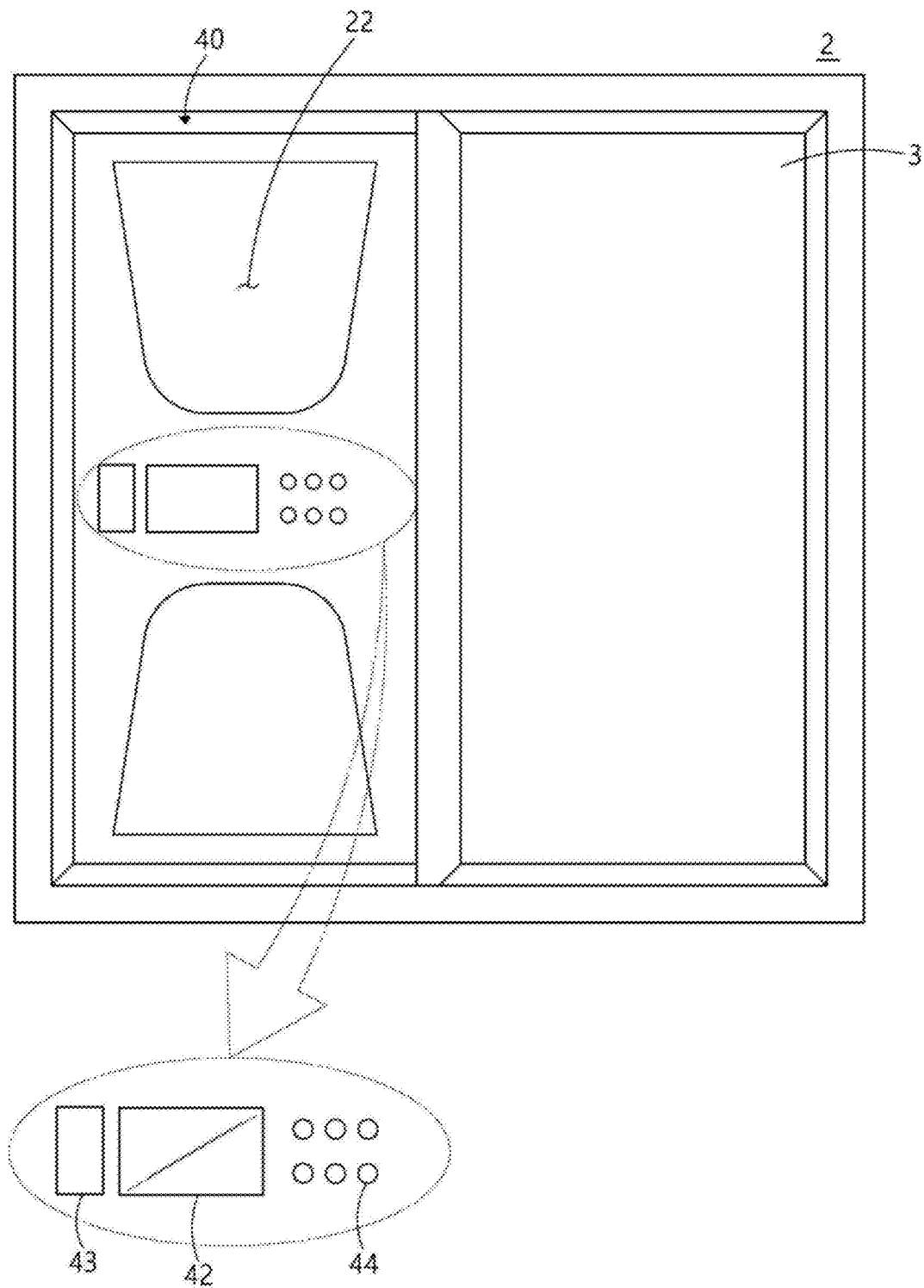
FIG. 4 is a front view of a window-type smart air purifying ventilator according to an embodiment of the present invention.
Figure 5:
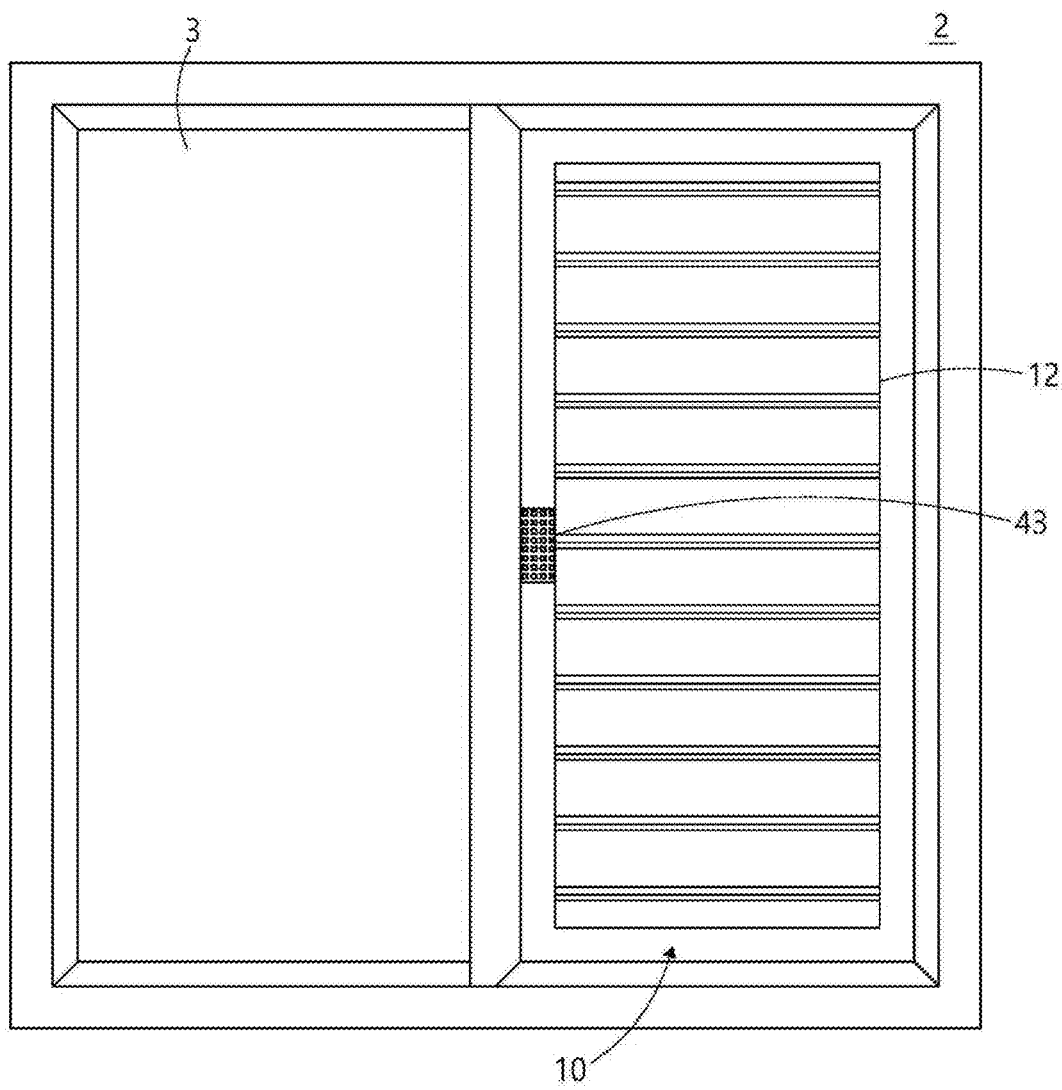
FIG. 5 is a rear view of a window-type smart air purifying ventilator according to an embodiment of the present invention.

FIGS. 4 and 5 are front and rear views, respectively, of a window-type smart air purifying ventilator according to an embodiment of the present invention.

The smart air purifying ventilator 1 installed on the window frame 2 is provided in a blank space created by opening the window 3. In the case of the window frame 2 composed of double windows, the smart air purifying ventilator 1 may be placed between the double windows. The smart air purifying ventilator 1 may also be installed in a blank space created by opening the window 3 as in the conventional case.

The front panel part 40 is disposed so as to face the indoor space where users mainly residue, so that the users may easily control the smart air purifying ventilator 1. In addition, the front panel part 40 may be operated in an automatic or manual mode.

Therefore, the buttons 44 for allowing a user to control the inflow/outflow of air by the blowing part 30, the rotation speed of the fans 34 of the blowing part 30, and operation of the wings 12 of the outdoor side cover part 10 may be provided on the front panel part 40. Alternately, the rotation speed of the fans 34 of the blowing part 30, the inflow/outflow of air by the blowing part 30, and the like may be controlled using a smartphone or a remote control.

In addition, the control unit provided with a camera may include another camera disposed to face the indoor space. The camera disposed to face the indoor space may act as a CCTV for security. For example, when an intruder intrudes into the room in the absence of a user, the user may be immediately notified of this situation through the camera. In addition, the control unit may be connected to a server (not shown) and controlled through a communication means such as a smartphone. That is, operation of the smart air purifying ventilator 1 may be remotely controlled indoors or outdoors through an app installed in a smartphone.

The outdoor side cover part 10 is preferably disposed to face the outside and serves to introduce outside air into the indoor space or to discharge indoor air to the outside. In the outdoor side cover part 10, the wings 12 are arranged in the vertical direction of the smart air purifying ventilator 1. The outdoor side cover part 10 is normally closed, and opening/closing operation of the wings 12 is activated only when the blowing part 30 is driven. By opening/closing the rotatable wings 12, a user may achieve the same effect as opening/closing the window 3.

In addition, the solar cell unit 50 installed in the wing 12 does not necessarily need to be attached to the wing 12. The wing 12 may be the solar cell unit 50 itself. Depending on situations, when a sufficient amount of sunlight does not reach the wings 12, the solar cell units 50 may be separately installed and may be connected to the control unit.

In addition, the sensors 43 installed on the front panel part 40 may be provided on the outdoor side cover part 10. Temperature, humidity, a noise level, fine dust concentration, $CO_2$ concentration, and the amount of other pollutants may be measured by the sensors 43 installed on the outdoor side cover part 10 and the sensors 43 installed on the front panel part 40. Then, the measured data may be compared, and based on the results of comparative analysis, operation may be controlled.

Figure 6:
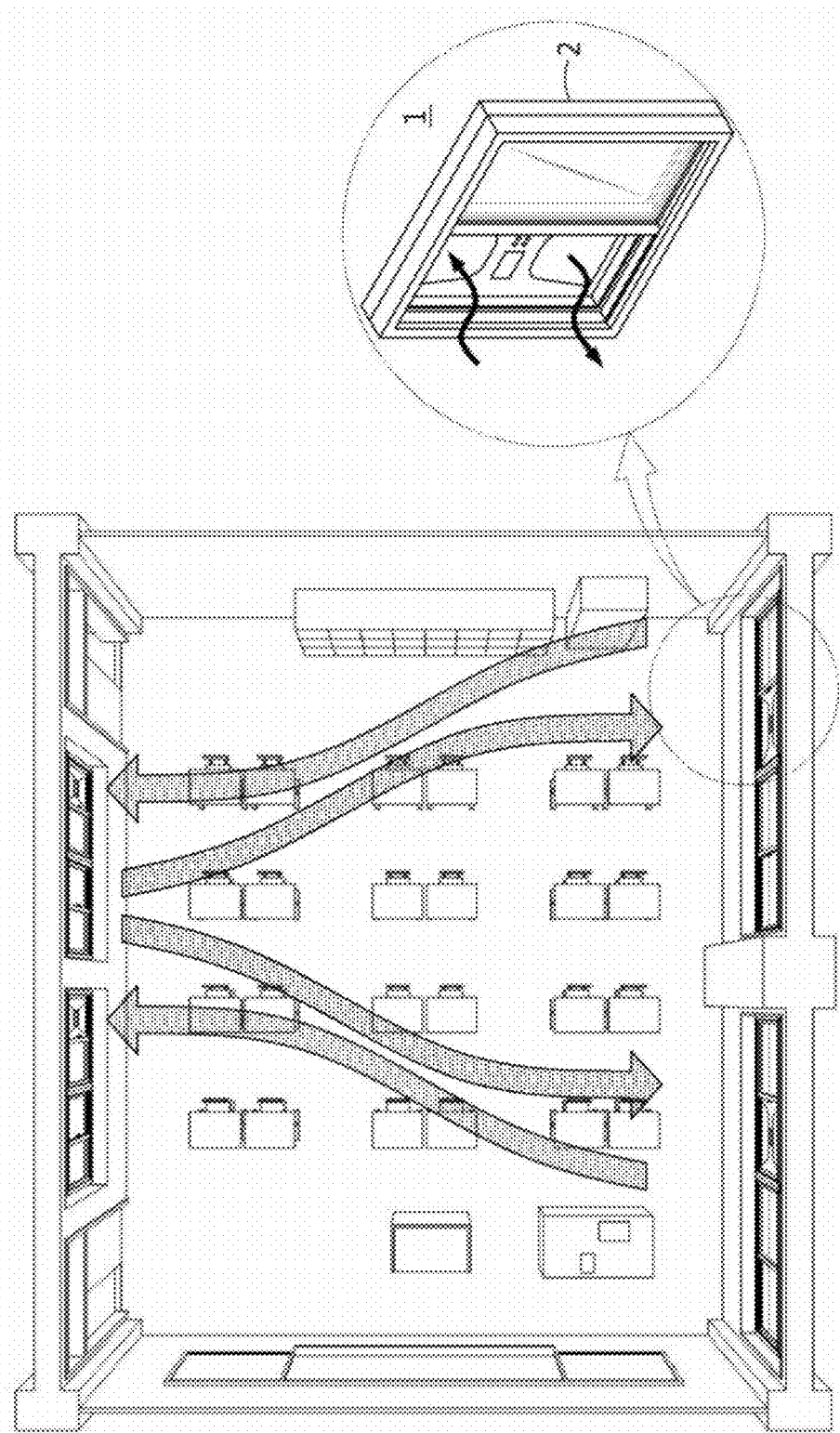
FIG. 6 is an installation example of a window-type smart air purifying ventilator according to an embodiment of the present invention.

FIG. 6 shows an installation example of a window-type smart air purifying ventilator according to an embodiment of the present invention.

In FIG. 6, a classroom where the smart air purifying ventilators 1 are installed is shown. The smart air purifying ventilator 1 is installed on the window frame 2 facing the outside and the window frame 2 facing a hallway to effectively ventilate the inside of the classroom.

Outside air is introduced into the inside of the classroom by the smart air purifying ventilator 1 installed on the window frame 2 facing the outside, the introduced air is mixed with indoor air, and then the mixed air is discharged to the outside by the smart air purifying ventilator 1 installed on the window frame 2 facing a hallway. As a result, the polluted air in the classroom is diluted by the introduced air and discharged to the outside, so that the degree of pollution of the classroom gradually decreases.

The smart air purifying ventilator 1 installed on the window frame 2 facing the outside and the smart air purifying ventilator 1 installed on the window frame 2 facing a hallway may be manually operated separately so that air is introduced into the indoor space through the window frame 2 facing the outside and indoor air is discharged through the window frame 2 facing a hallway.

In addition, air flow may be automatically controlled by the sensors 43 of the control unit. For example, the sensors 43 may compare outside air with indoor air to introduce the outside air into the indoor space, and may compare indoor air with hallway air to discharge the indoor air into the hallway. That is, air flow may be controlled by the control unit so that air flows in one direction.

To achieve the same ventilation effect as in the embodiment of the present invention, the window 3 should be installed in both side walls, and at least one smart air purifying ventilator 1 should be installed on each of the window frames 2. However, depending on external temperature and the degree of air pollution, air movement direction may be changed at any time.

In addition to a classroom, the smart air purifying ventilator 1 may be installed in a building, such as a house or an office, where the window 3 is installed. In addition, in addition to the boundary between the indoor and outdoor spaces, the smart air purifying ventilator 1 may be installed in an inner wall or an inner window for separating the indoor spaces, and may circulate air inside the building. For example, the smart air purifying ventilator 1 may be installed between a conference room and a hallway, and a comfortable indoor space may be formed through inflow/outflow of air by the smart air purifying ventilator 1.

Figure 7:
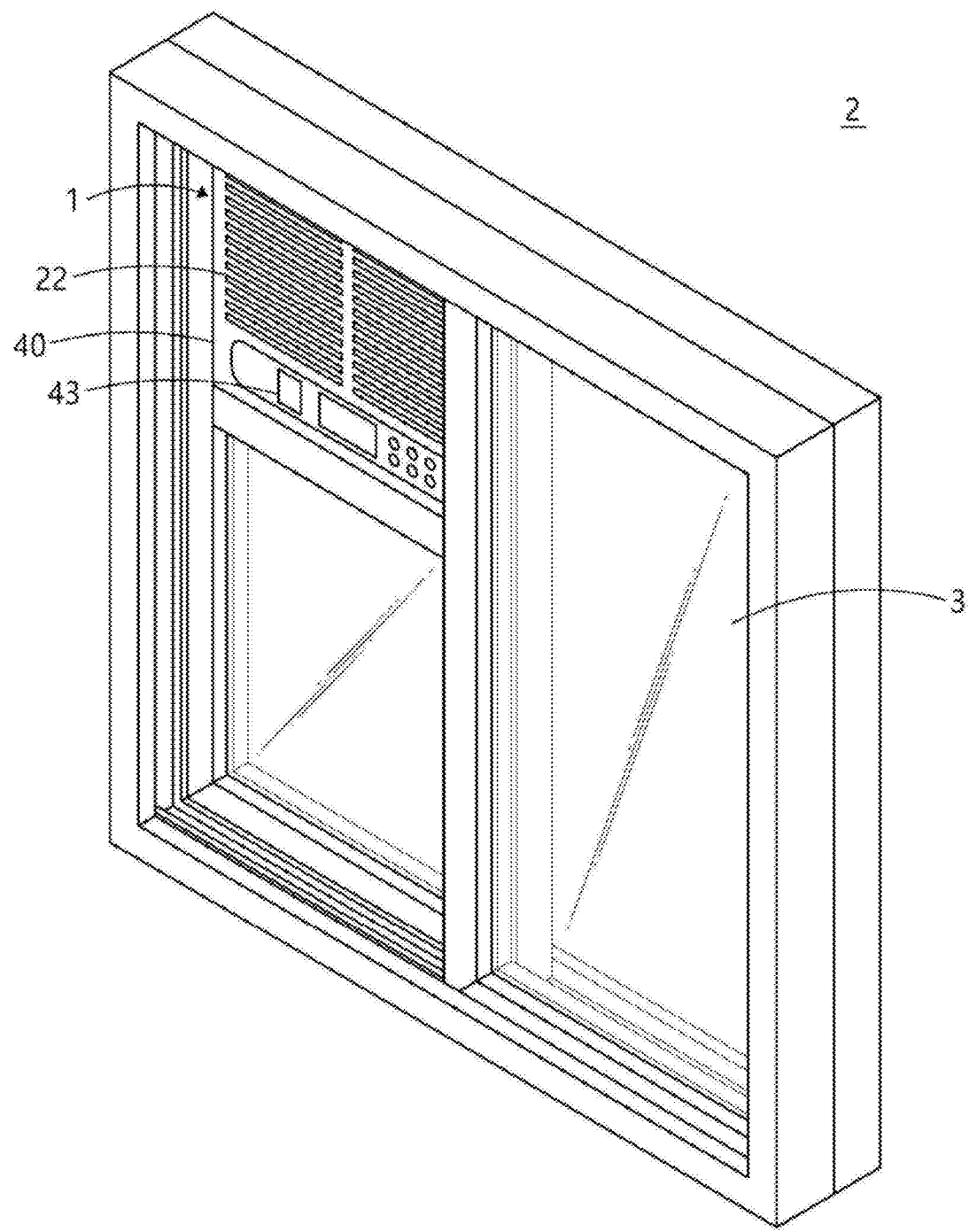
FIG. 7 is a perspective view of a window-type smart air purifying ventilator according to another embodiment of the present invention.
Figure 8:
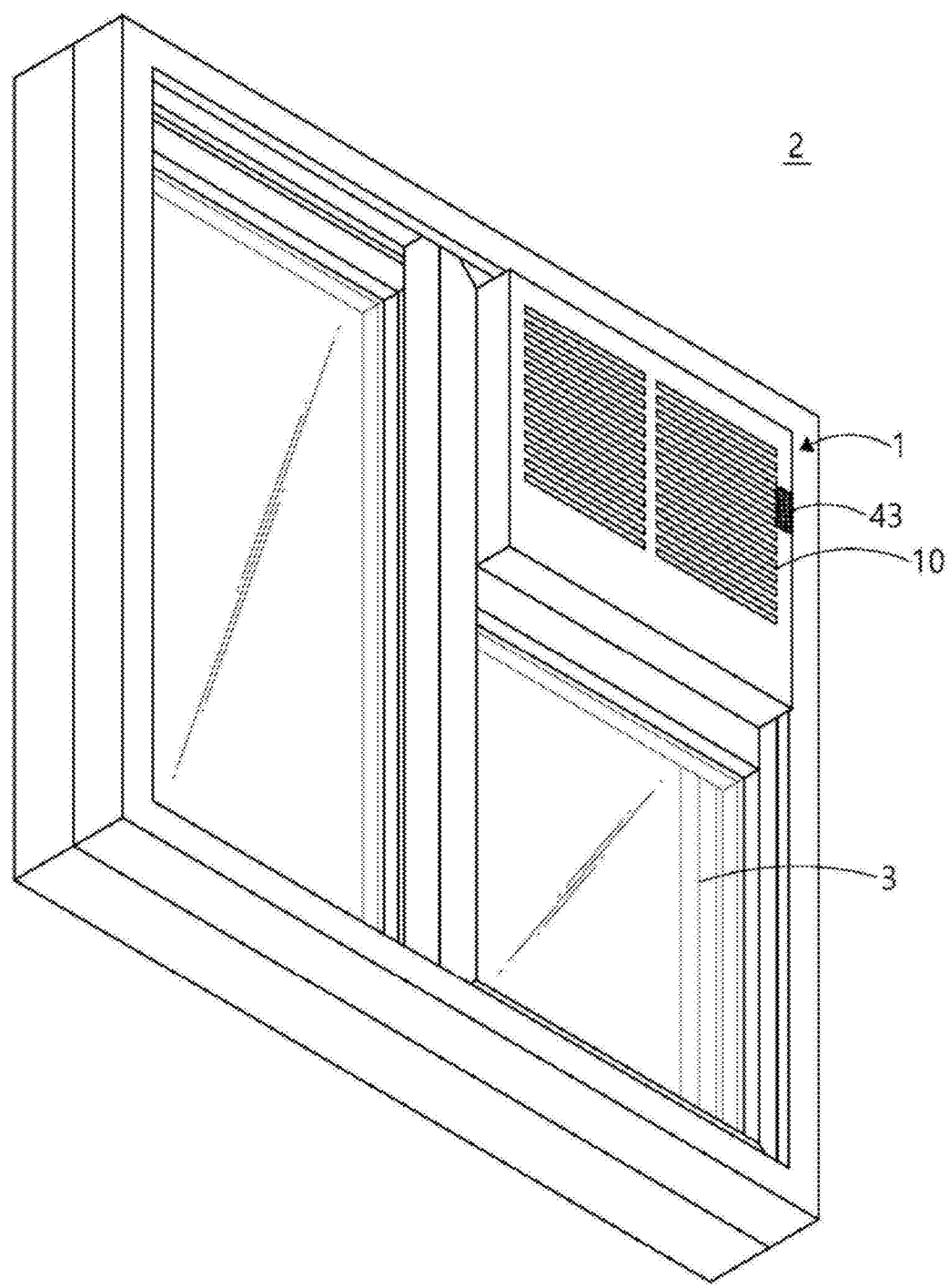
FIG. 8 is a rear perspective view of a window-type smart air purifying ventilator according to another embodiment of the present invention.

FIGS. 7 and 8 are perspective views of window-type smart air purifying ventilators according to another embodiment of the present invention.

The window-type smart air purifying ventilators shown in FIGS. 7 and 8 are manufactured by miniaturizing the first-described smart air purifying ventilator 1. Since the window-type smart air purifying ventilators shown in FIGS. 7 and 8 are installed in a part of the window 3, the disadvantages (e.g., blocking of view and sunlight due to blocking of the window 3) of the first-described smart air purifying ventilator 1 installed in the entire window 3 may be solved.

That is, one opening 22 is formed in the frame part 20. In the window frame 2, the opening 22 is installed at the upper or lower end of the window 3 and placed on the same plane as the window 3.

In the smart air purifying ventilator 1, since only one opening 22 is formed in the frame part 20, one blowing part 30 composed of the filters 32 and the fans 34 is installed. Air is only introduced or discharged through the installed blowing part 30. However, the display 42 and the buttons 44 are installed in the front panel part 40 in the same manner as described above. In addition, the outdoor side cover part 10 is provided with the wings 12 capable of being opened/closed.

Since the frame part 20 is disposed together with the window 3, openness and lightening may be improved. In addition, compared with the first-described smart air purifying ventilator 1, the number of parts may be reduced, thereby lowering the product price.

Figure 9:
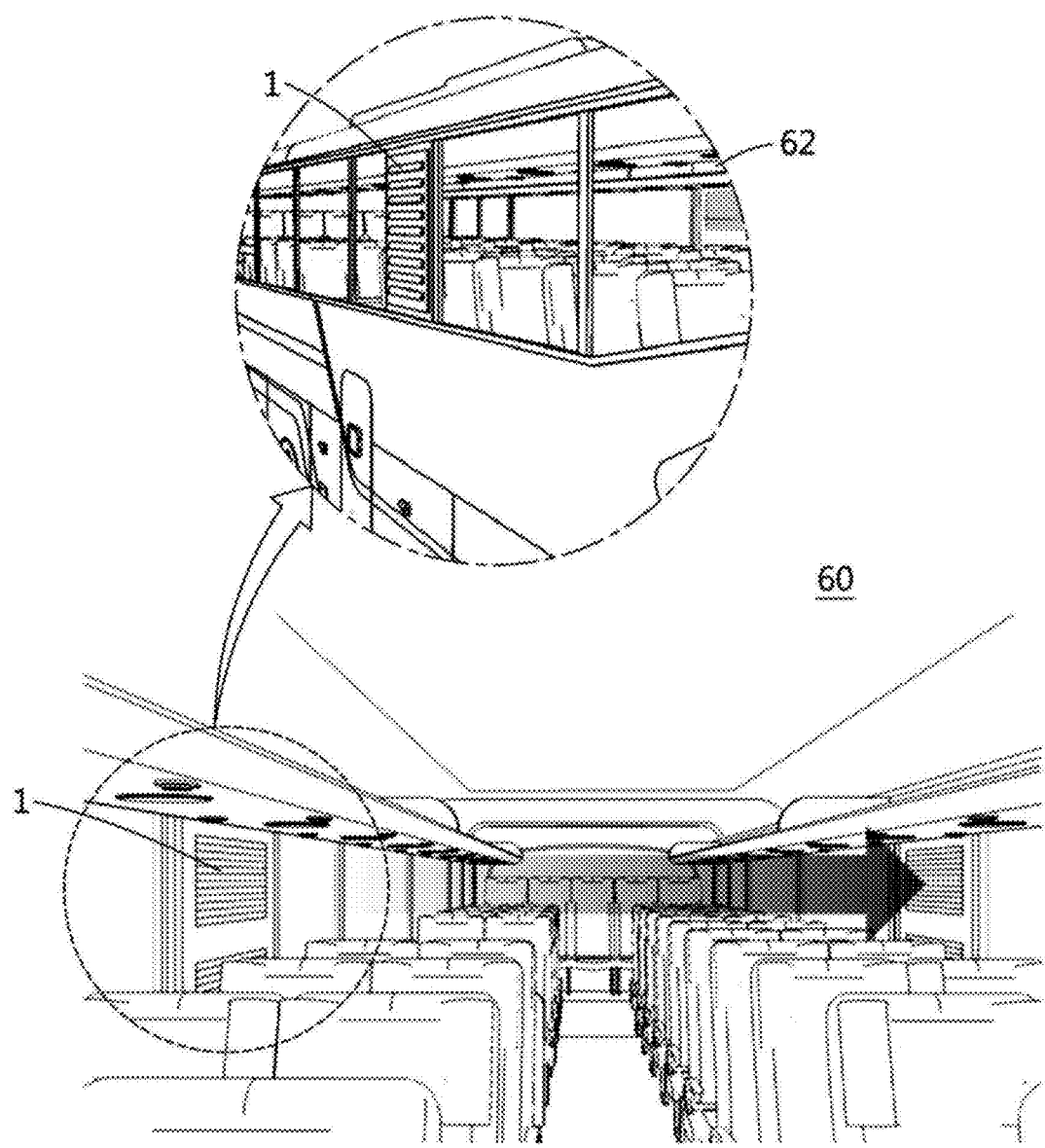
FIG. 9 is an installation example of a window-type smart air purifying ventilator according to another embodiment of the present invention.

FIG. 9 shows an installation example in which a window-type smart air purifying ventilator according to another embodiment of the present invention is installed in the windows of a vehicle.

In the case of a vehicle 60 such as a bus in which many people ride, when a large number of people board the vehicle 60, air quality inside the vehicle 60 is drastically deteriorated, so that the passengers may feel uncomfortable or be easily tired. In addition, even when the inside of the vehicle 60 is ventilated by opening the windows 62, air may not circulate smoothly as long as the wind does not blow.

Therefore, when the smart air purifying ventilator 1 is installed in a part of the window 62 of the vehicle 60, air inside the vehicle 60 may be forcibly discharged, and air outside the vehicle 60 may be forcibly introduced into the vehicle 60. Thus, inflow/outflow of air may be performed at the same time, so that air inside the vehicle 60 may be comfortable. In addition, depending on situations, air inside the vehicle 60 may only be forcibly discharged, or air outside the vehicle 60 may only be forcibly introduced into the vehicle 60.

The smart air purifying ventilator 1 should be installed in the window 62 of at least one side of the vehicle 60. To make the air condition inside the vehicle 60 more comfortable, it is preferable to install the smart air purifying ventilator 1 in the windows 62 on both sides of the vehicle 60 so that air flows smoothly in one direction.

In addition to a bus, the smart air purifying ventilator 1 may be applied to various kinds of vehicles 60, trains, ships, and the like.

The present invention is not limited by the above-described embodiments and the accompanying drawings. It will be apparent to those skilled in the art that various changes, substitutions, and alterations may be made without departing from the spirit of the invention.

DESCRIPTION OF SYMBOLS

1: SMART AIR PURIFYING VENTILATOR
2: WINDOW FRAME
3: WINDOW
10: OUTDOOR SIDE COVER PART
12: WINGS
20: FRAME PART
22: OPENINGS
30: BLOWING PART
32: FILTERS
34: FANS
35: FIRST BLOWER
36: SECOND BLOWER
40: FRONT PANEL PART
42: DISPLAY
43: SENSOR
44: BUTTONS
50: SOLAR CELL UNITS
60: VEHICLE
62: WINDOW

The invention claimed is:

1. A window-type smart air purifying ventilator, comprising:
   a frame part installed on a window frame and having two or more openings formed therein;
   a blowing part installed in the frame part and responsible for introducing or discharging air through the openings;
   filters for purifying air introduced or discharged by the blowing part;
   an outdoor side cover part coupled to one side of the frame part;
   a front panel part coupled to another side of the frame part; and
   a control unit for comparing inside and outside air conditions of the window frame and controlling the blowing part to determine inflow or outflow of air,
   wherein the filter is a multilayer filter in which a filter for filtering large particles, a PM10 filter for filtering fine dust, and a PM2.5 filter for filtering ultrafine dust are arranged in order.

2. The window-type smart air purifying ventilator according to claim 1, wherein the frame part is installed on the window frame to be opened and closed in a sliding manner.

3. The window-type smart air purifying ventilator according to claim 1, wherein the outdoor side cover part comprises a plurality of wings capable of being driven, and depending on operation of the wings, opening, closing, or partial closing is performed.

4. The window-type smart air purifying ventilator according to claim 3, wherein, during rain, the wings are driven to completely or partially shield the outdoor side cover part.

5. The window-type smart air purifying ventilator according to claim 1, wherein solar cell units are installed on the outdoor side cover part or the wings, convert sunlight into electric energy, and supply electric power to the blowing part.

6. The window-type smart air purifying ventilator according to claim 1, wherein the control unit comprises a sensor for detecting at least one of indoor/outdoor temperatures, humidity, noise levels, fine dust concentration, $CO_2$ concentration, and pollutant concentration, and
   depending on information detected by the sensor, at least one of inflow/outflow of air through the blowing part and a rotation speed of the fans is controlled.

7. The window-type smart air purifying ventilator according to claim 6, wherein the sensor measures an indoor noise level, and when an indoor noise level is greater than or equal to a predetermined value, a rotation speed of the fans is increased to accelerate inflow/outflow of air, and when an indoor noise level is less than or equal to a predetermined value, a rotation speed of the fans is decreased or operation of the fans is stopped.

8. The window-type smart air purifying ventilator according to claim 1, wherein the front panel part further comprises a display for displaying at least one of indoor/outdoor fine dust concentrations, temperature, humidity, weather information, and an image of scenery outside the window frame.

9. The window-type smart air purifying ventilator according to claim 1, wherein the control unit is connected to a server and controlled by a communication means.

10. The window-type smart air purifying ventilator according to claim 1, wherein one opening is formed in the frame part, wherein the opening is disposed at an upper or lower end of a window and placed on an identical plane as the window in the window frame.

11. The window-type smart air purifying ventilator according to claim 1, wherein the frame part is installed on a window frame of a vehicle, and circulates air of the vehicle.

12. A window-type smart air purifying ventilator, comprising:
    a frame part slidably installed on a window frame;
    a blowing part installed inside the frame part and responsible for introducing air into one side of the frame part or for discharging air to another side of the frame part;
    a filter for removing foreign substances from air introduced or discharged by the blowing part; and
    a control unit for controlling at least one of inflow/outflow of air through the blowing part and a rotation speed of the blowing part, depending on at least one of temperature difference between one side and another side of the window frame, humidity, fine dust concentration, $CO_2$ concentration, and pollutant concentration,
    wherein the filter is a multilayer filter in which a filter for filtering large particles, a PM10 filter for filtering fine dust, and a PM2.5 filter for filtering ultrafine dust are arranged in order.

13. The window-type smart air purifying ventilator according to claim 12, further comprising:
    an outdoor side cover part coupled to one side of the frame part; and
    a front panel part coupled to another side of the frame part,
    wherein the outdoor side cover part comprises a plurality of wings capable of being driven, and depending on operation of the wings, opening or closing is performed;
    the front panel part comprises a display for displaying at least one of indoor/outdoor fine dust concentrations, temperature, humidity, weather information, and an image of an outside of the window frame.

14. The window-type smart air purifying ventilator according to claim 13, wherein solar cell units are installed on the outdoor side cover part, convert sunlight into electric energy, and supply electric power to the blowing part.

15. The window-type smart air purifying ventilator according to claim 12, wherein the control unit is connected to a server and controlled by a communication means.

16. The window-type smart air purifying ventilator according to claim 12, wherein the frame part is installed on a window frame of a vehicle, and circulates air of the vehicle.

* * * * *